United States Patent
Chan et al.

(10) Patent No.: US 7,302,441 B2
(45) Date of Patent: Nov. 27, 2007

(54) SYSTEM AND METHOD FOR GRADUALLY BRINGING ROLLED IN DATA ONLINE WITH INCREMENTAL DEFERRED INTEGRITY PROCESSING

(75) Inventors: Petrus Kai Chung Chan, Richmond Hill (CA); Miroslaw Adam Flasza, Pickering (CA); Dieu Quang La, Markham (CA); Bruce Gilbert Lindsay, San Jose, CA (US); William T. O'Connell, Etobicoke (CA)

(73) Assignee: International Business Machines Corporation, Armonk, NY (US)

( * ) Notice: Subject to any disclaimer, the term of this patent is extended or adjusted under 35 U.S.C. 154(b) by 554 days.

(21) Appl. No.: 10/896,154

(22) Filed: Jul. 20, 2004

(65) Prior Publication Data

US 2006/0020605 A1 Jan. 26, 2006

(51) Int. Cl.
*G06F 17/00* (2006.01)
(52) U.S. Cl. .................. 707/101; 707/102; 707/103 R; 707/104.1
(58) Field of Classification Search .............. 707/1–10, 707/100–104.1, 200–205
See application file for complete search history.

(56) References Cited

U.S. PATENT DOCUMENTS

| 6,453,314 | B1 | 9/2002 | Chan et al. ..................... 707/3 |
| 6,457,013 | B1 | 9/2002 | Saxton et al. ................ 707/101 |
| 6,597,809 | B1 | 7/2003 | Ross et al. ................... 382/229 |
| 6,647,510 | B1 | 11/2003 | Ganesh et al. ................. 714/16 |
| 6,778,977 | B1* | 8/2004 | Avadhanam et al. ........... 707/2 |
| 2001/0047360 | A1 | 11/2001 | Huras et al. ................. 707/102 |
| 2002/0095408 | A1 | 7/2002 | Cheng ........................... 707/3 |
| 2002/0143764 | A1 | 10/2002 | Martin et al. ................... 707/8 |
| 2002/0173911 | A1 | 11/2002 | Brunet et al. ................... 702/1 |
| 2003/0208506 | A1 | 11/2003 | Greenfield et al. ......... 707/102 |
| 2003/0212789 | A1 | 11/2003 | Hamel et al. ............... 709/225 |

OTHER PUBLICATIONS

Chen et al., *Materialized View Signature and Efficient Identification of Materialized View Candidates for Queries*, U.S. Appl. No. 10/324,800, filed Dec. 19, 2003, IBM Docket SVL920030007US1.
Nelson, *System. Method and Computer Program for Providing a Time Map of Rolled-up Data*, U.S. Appl. No. 10/392,654, filed Mar. 20, 2003, IBM Docket SVL920030007US1.

* cited by examiner

*Primary Examiner*—Isaac Woo
(74) *Attorney, Agent, or Firm*—Sughrue Mion, PLLC

(57) ABSTRACT

Disclosed is a data processing system, a data processing system-implemented method and an article of manufacture for providing general user availability while integrity processing of rolled-in data is deferred and performed incrementally. The data processing system includes a data warehouse administration module for administering a data warehouse to include a table dividable into portions for containing rows of rolled-in data, a first and a second delimiter delimiting the start and the end respectively of each portion, a metadata element having an entry corresponding to the start and end delimiters delimiting each portion, a third delimiter for delimiting, between the first delimiter and the third delimiter, a sub-portion of the portion, and an operations management module having operation mechanisms for performing operations on the data warehouse responsive to the delimiters.

18 Claims, 5 Drawing Sheets

SYSTEM AND METHOD FOR GRADUALLY BRINGING ROLLED IN DATA ONLINE WITH INCREMENTAL DEFERRED INTEGRITY PROCESSING

FIELD OF INVENTION

The present invention relates to the field of database management systems. In particular, the present invention relates to a data processing system, a data processing system-implemented method and an article of manufacture for deferred incremental integrity processing of rolled in data in a data warehouse.

BACKGROUND

In a typical data warehouse environment large amounts of data are periodically rolled into tables. In the case of new data being rolled into a table, before the new data can be accessible to a general user of the table, integrity processing (e.g. constraint checking, index maintenance, and materialized view maintenance) must be preformed on the new data. It is desirable that existing data in the table remain fully on-line and available to the general user while integrity processing is performed on the rolled in data. Existing methods typically either bring the entire table off-line or bring the table on-line in a read-only mode while the integrity processing of the rolled in data is carried out.

Also, as the volume of data being rolled into the table can be significant, existing systems, which typically integrity process the rolled-in data all at once, can create significant delays before any of the rolled-in data is made available to the general user.

What is needed is a mechanism to permit full on-line access to a table while integrity processing of rolled in data is deferred to a later time and carried out on an incremental basis. Preferably the integrity processed rolled-in data can be made available (on-line accessible) gradually as processing of each increment of data is completed.

SUMMARY

In accordance with one aspect of the present invention, there is provided a data processing system for providing general user availability while integrity processing of rolled-in data is deferred and performed incrementally, the data processing system including a data warehouse administration module for administering a data warehouse to include a table dividable into portions for containing rows of rolled-in data, a first and a second delimiter delimiting the start and the end respectively of each portion, a metadata element having an entry corresponding to the start and end delimiters delimiting each portion, a third delimiter for delimiting, between the first delimiter and the third delimiter, a sub-portion of the portion, and an operations management module having operation mechanisms for performing operations on the data warehouse responsive to the delimiters.

In accordance with another aspect of the present invention, there is provided a data processing system-implemented method of directing a data processing system to provide general user availability while integrity processing of rolled-in data is deferred and performed incrementally, the data processing system-implemented method including administering a data warehouse to includes a table dividable into portions for containing rows of rolled-in data, a first and a second delimiter delimiting the start and the end respectively of each portion, a metadata element having an entry corresponding to the start and end delimiters delimiting each portion, a third delimiter for delimiting, between the first delimiter and the third delimiter, a sub-portion of the portion, and performing operations on the data warehouse responsive to the delimiters.

In accordance with still another aspect of the present invention, there is provided an article of manufacture for directing a data processing system to provide general user availability while integrity processing of rolled-in data is deferred and performed incrementally, the article of manufacture including a program usable medium embodying one or more instructions executable by the data processing system, the one or more instructions including data processing system executable instructions for administering a data warehouse to includes a table dividable into portions for containing rows of rolled-in data, a first and a second delimiter delimiting the start and the end respectively of each portion, a metadata element having an entry corresponding to the start and end delimiters delimiting each portion, a third delimiter for delimiting, between the first delimiter and the third delimiter, a sub-portion of the portion, data processing system executable instructions for performing operations on the data warehouse responsive to the delimiters.

Other aspects and features of the present invention will become apparent to those ordinarily skilled in the art to which it pertains upon review of the following description of specific embodiments of the invention in conjunction with the accompanying figures.

BRIEF DESCRIPTION OF DRAWINGS

The present invention will be described in conjunction with the drawings in which.

DETAILED DESCRIPTION

An embodiment provides for the deferral and incremental performance of integrity processing for data rolled into a table of a data warehouse. The embodiment permits the table to be on-line and accessible during integrity processing. The rolled-in data is contained within specific data portions of the table. Each data portion in the table has one or more contiguous rows of data. Rolled-in data is placed in one or more portions of the table. Table operation mechanisms are arranged such that general users of the table do not access rolled-in data in a portion for which integrity processing has not yet been performed. A sub-portion can be delimited from each portion. Integrity processing is applied to the sub-portion. When integrity processing is complete, the content of the sub-portion is made accessible and the remainder of the portion can be sub-portioned and integrity processed repeatedly until all rolled-in data is processed and made accessible. Thereby, after data is rolled-in, the data warehouse can be made available to the general user while integrity processing is deferred and can be incrementally performed. The integrity processed rolled-in data can be gradually made available as each increment of data has been processed.

Figure 1:
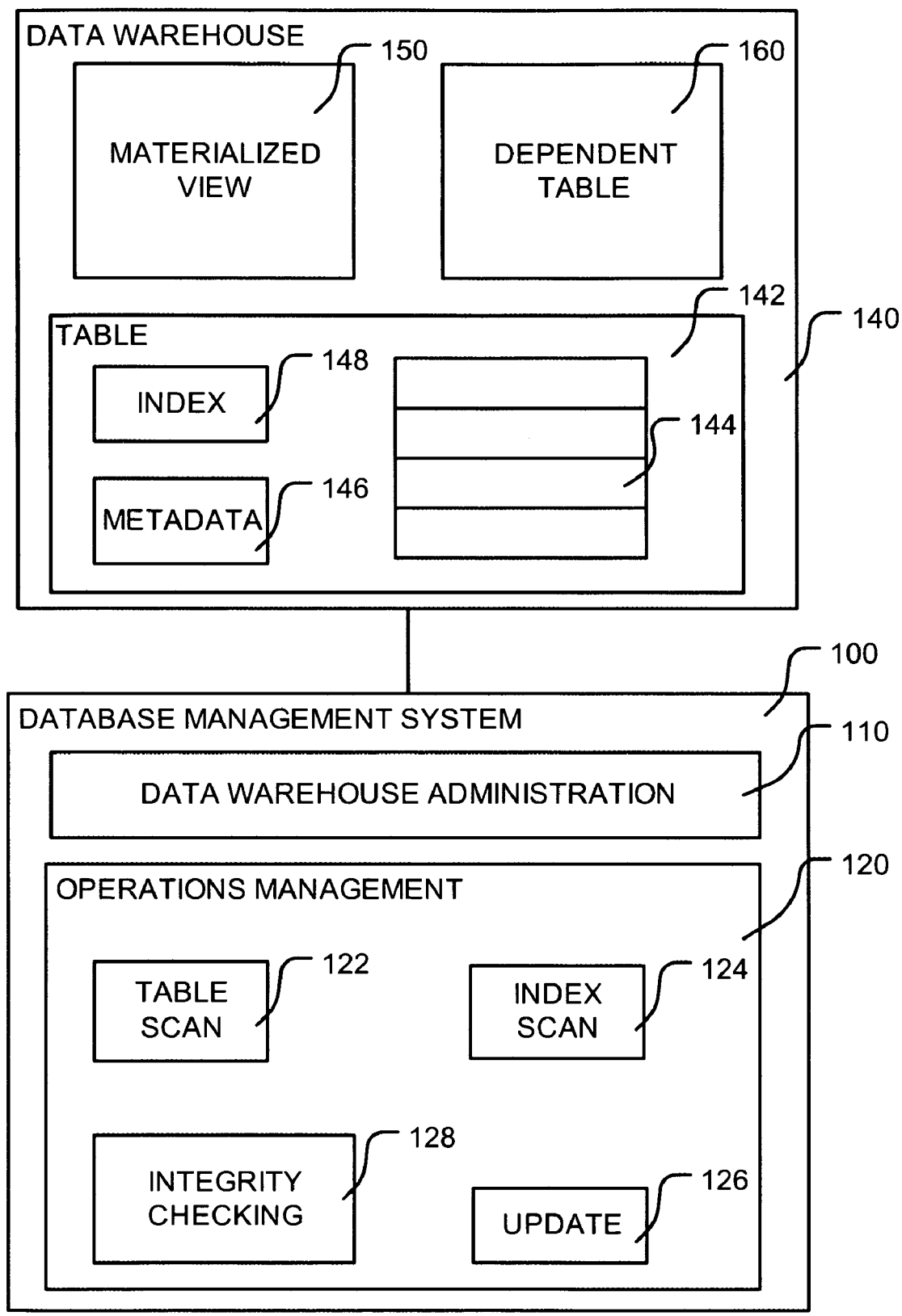
FIG. 1 is a schematic representation of an exemplary embodiment of a database management system according to the present invention and a data warehouse.

FIG. 1 is a schematic representation of an exemplary embodiment of a database management system 100 according to the present invention and a data warehouse 140. The database management system 100 comprises a data warehouse administration module 110 and an operations management module 120. The database management system 100 is arranged for operative coupling to a data processing system, such as for example the generic computing platform represented in FIG. 4 and described below, having memory for storing the data warehouse 140. The database management system 100 interacts with the data warehouse 140 in order to administer and operate on the contents of the data warehouse 140. The data warehouse administration module 110 provides administrative functions such as, for example, management of a data model and schema for the data warehouse 140. The data warehouse administration module 110 provides for the data warehouse 140 to contain one or more tables 142 each having a plurality of rows of data. Each table 142 can have data portions (herein after portions) 144 each containing one or more contiguous rows of the table 142. Each table 142 can have one or more index mechanisms 148. An index mechanism 148 provides for the association of an index key with one or more rows of the table 142. The operations management module 120 comprises mechanisms that provide for a range of data warehouse operations. Theses operations mechanisms can include: table scan 122, index scan 124, data update 126 (e.g. modify, insert and delete) and integrity processing 128.

The data warehouse 140 has one or more tables 142, one or more materialized views 150 and one or more dependant tables 160. A dependent table 160 is one that has a referential dependency on another table, such as table 142.

Figure 2A:
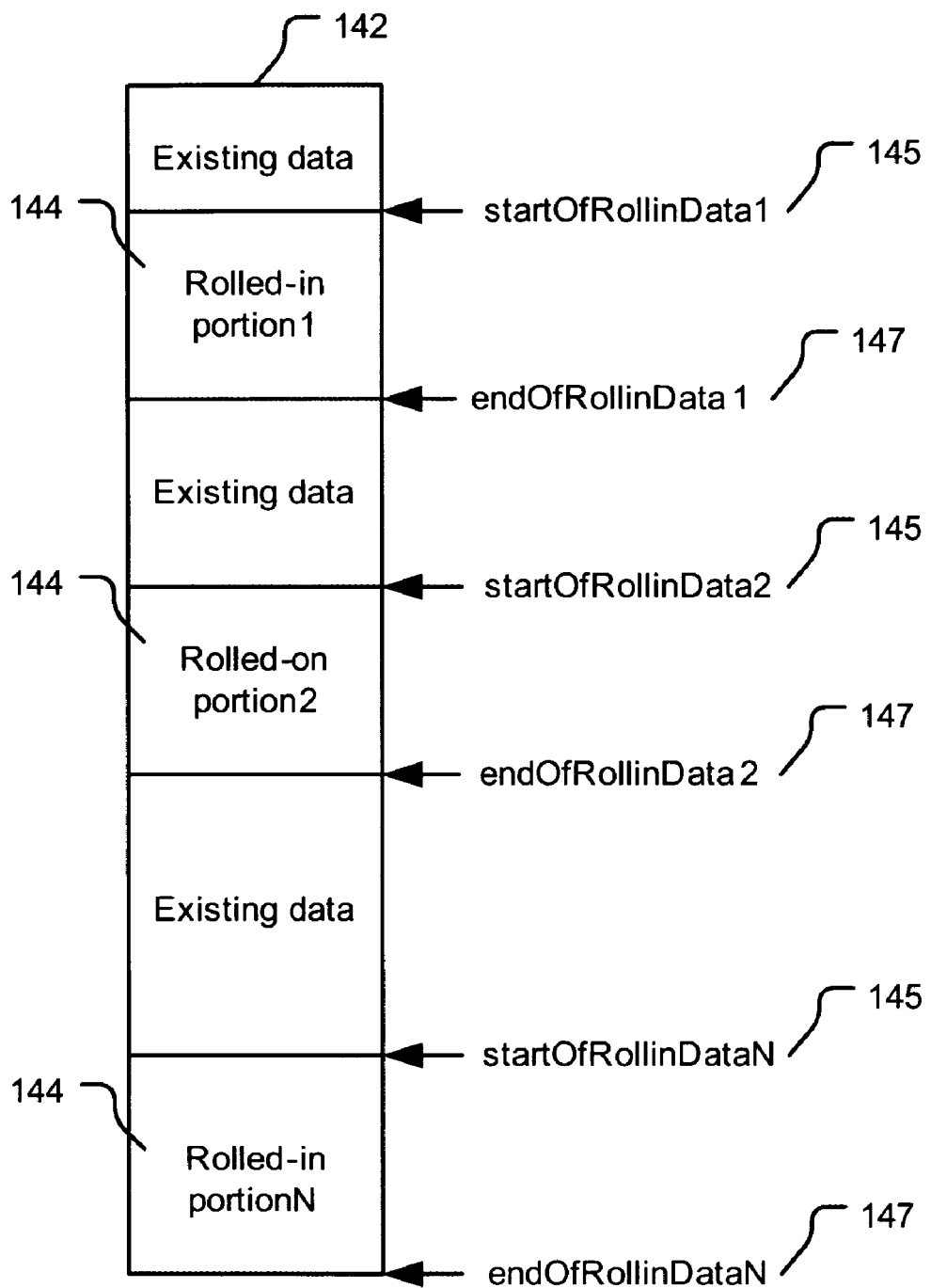
FIGS. 2 A, B and C are schematic representations of portions of a table in accordance with an exemplary embodiment of the present invention.

FIGS. 2 A, B and C are schematic representations of portions of the table 142 in accordance with an exemplary embodiment of the present invention. When data is rolled into the table 142, the rolled-in data is placed into one or more portions 144. The first portion 144 that contains rolled-in data is delimited by delimiters marking the beginning and the end of the portion 144 such as, for example, the delimiters 'startOfRollinData1' 145 and 'endOfRollinData1' 147 respectively. Similarly, each of the subsequent portions 144 containing rolled-in data are delimited by delimiters 145, 147 where the digit '1' in the delimiter name is replaced by the ordinal number of the portion 144 (e.g. 2, 3, . . . , N). Alternatively, other forms of delimiters that permit the start and the end of portions 144 to be marked and the delimiters associated with each portion 144 to be distinguished can be used. The delimiters 145, 147 for each of the portions 144 containing rolled-in data can be stored in the table metadata 146. The existence of the delimiters 145, 147 associated with a portion 144 can be used to signify that integrity processing of the rolled-in data in the portion 144 has not yet been performed.

In the exemplary embodiment of the present invention the table scan mechanism 122 is arranged to treat as invisible any rows in a portion 144 delimited by 'startOfRollinDataX' 145 and 'endOfRollinDataX' 147 delimiters (where 'X' is the ordinal number of the portion). The index scan mechanism 124 is arranged to treat as invisible any index entry that refers to a row in a portion 144 delimited by 'startOfRollinDataX' 145 and 'endOfRollinDataX' 147 delimiters.

The update mechanism 126 provides for operations on data in the table 142 including: modify, insert and delete. In the case of modify and delete operations, the update mechanism treats as invisible any rows in a portion 144 delimited by 'startOfRollinDataX' 145 and 'endOfRollinDataX' 147 delimiters and therefore does not permit the operation to occur. In the case of insert operations, the update mechanism treats as invisible all portions 144 delimited by 'startOfRollinDataX' 145 and 'endOfRollinDataX' 147 delimiters. Therefore, an inserted row of data does not fall within any portion 144 delimited by 'startOfRollinDataX' 145 and 'endOfRollinDataX' 147 delimiters.

The above described behaviors for the table scan mechanism 122, index scan mechanism 124 and update mechanism 126 provide for the beneficial application of the present invention. When data has been rolled-in to the table 142 but has not yet been integrity checked, the above described behaviors permit the data warehouse 140 to be normally available (i.e. online accessible) to a general user for operations on the content of the data warehouse 140 that pre-existed the data roll-in without concern that the as yet not integrity checked, rolled-in data will negatively affect the general user's interaction with the data warehouse 140. This allows execution of integrity checking of the rolled-in data to be deferred to a later time and incrementally processed without negatively impacting or delaying general user access to pre-existing content of the data warehouse 140.

The integrity processing mechanism 128 can be invoked at some time after data is rolled-in to the table 142 for the purposes of applying integrity processing. Since the table 142 is generally assumed to be integrity consistent before data is rolled-in, the application of integrity processing can be limited to those portions 144 that contain rolled-in data. Portions 144 that contain rolled-in data are designated by the existence of the delimiters 145, 147 associated with the portion 144. The integrity processing mechanism 128 uses delimiters 145, 147 stored in metadata 146 to identify those portions 144 that contain rolled-in data and thereby determine which data requires integrity processing.

Figure 2B:
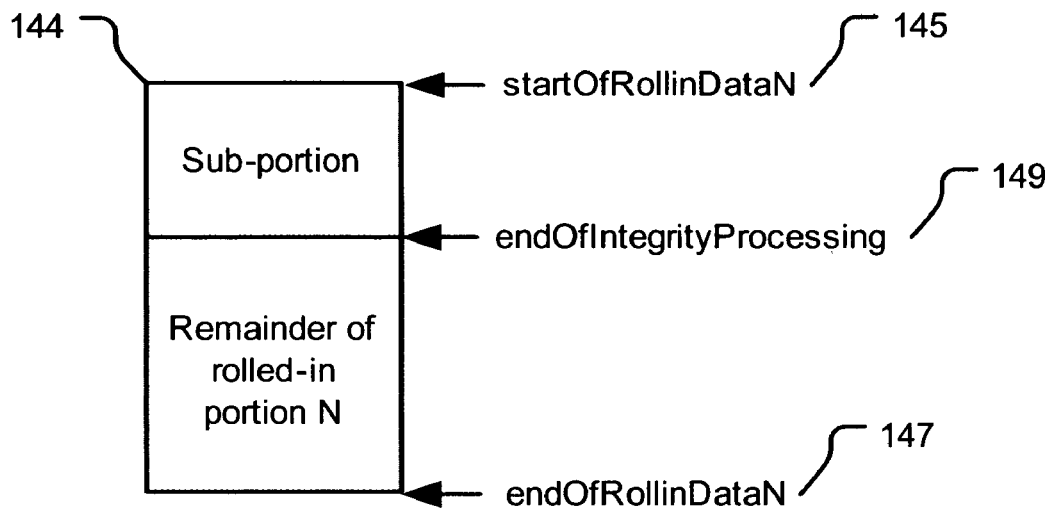

Portions 144 that contain rolled-in data can be integrity processed serially one after another or alternatively any or all portions 144 can be integrity processed in parallel. For each portion 144 to be integrity processed, a sub-portion of the portion 144 is designated. The sub-portion has one or more contiguous rows and is delimited by, for example, by the 'startOfRollinDataX' 145 delimiter and an 'endOfIntegrityProcessing' 149 delimiter as represented in FIG. 2B. (Note that the endOfIntegrityProcessing delimiter may be stored in the table metadata). Integrity processing of the sub-portion includes constraint checking, extraction of index keys and insertion into the index mechanism 148 and incremental refresh of dependent materialized views 150 for each row in the sub-portion. In order to keep the materialized views 150 synchronized with what is visible in the table 142, locks are applied to rows that are updated in the materialized views 150 with respect to the rows in the sub-portion. The locks are released when the rows in the sub-portion are made visible (i.e. when the sub-portion is completely integrity processed and is made online accessible).

Figure 2C:
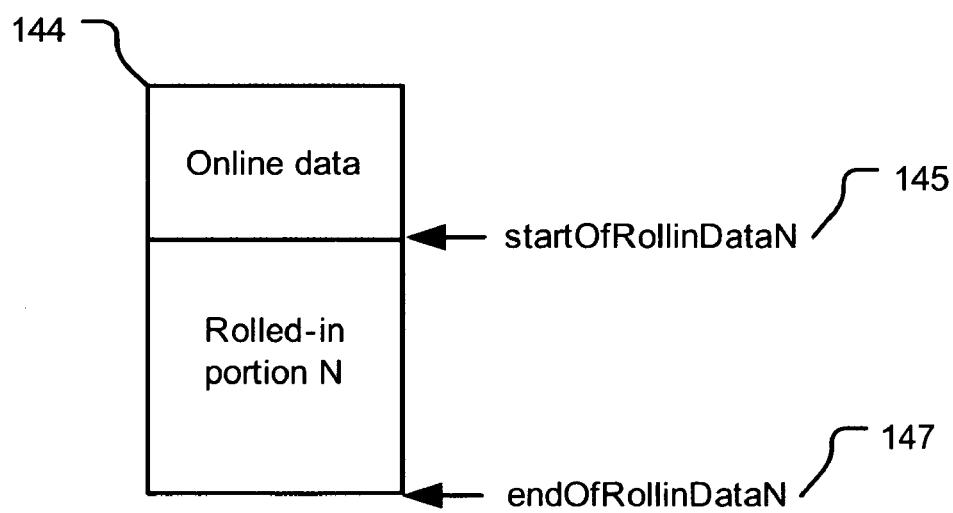

Once integrity processing is completed on the sub-portion, the rows of rolled-in data in the sub-portion can be made visible (i.e. online accessible) to general users of the data warehouse 140. The rows of the sub-portion are made visible by moving (i.e. reassigning) the 'startOfRollinDataX' 145 delimiter to be equal to the 'endOfIntegrityProcessing' 149 delimiter as represented in FIG. 2C. Thereby the integrity processed sub-portion is no longer part of the contiguous portion delimited by 'startOfRollinDataX' 145 and 'endOfRollinDataX' 147 delimiters and therefore will not be treated as invisible by the operations mechanisms 122, 124 and 126. Locks associated with rows in the sub-portion are released in the dependent materialized views 150. Another sub-portion can be designated in the manner describer above with reference to FIG. 2B and integrity processing can continue until all rolled-in data has been integrity processed and made online accessible.

Figure 3:
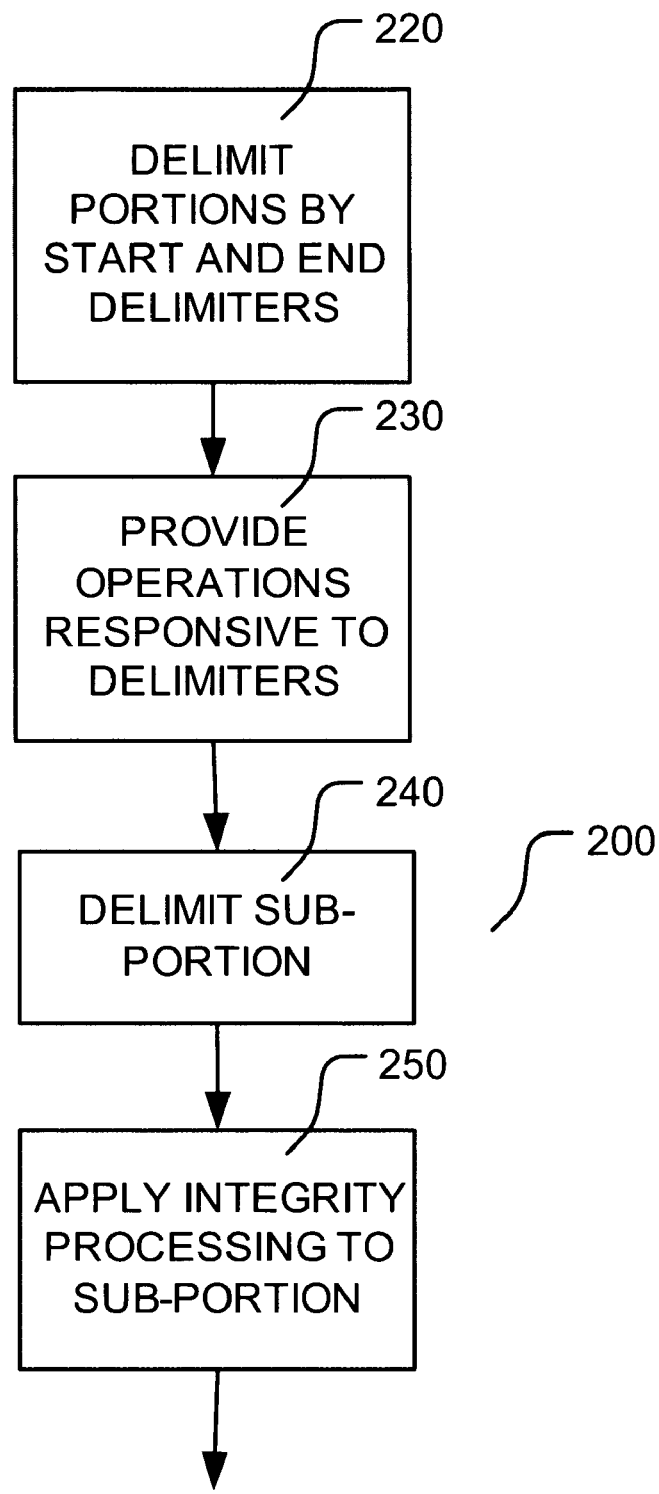
FIG. 3 is a flowchart representing the steps in an exemplary embodiment of a method according to the present invention.

FIG. 3 is a flowchart representing the steps in an exemplary embodiment of a method 200 according to the present invention. Data being rolled-in to a table 142 in a data warehouse 140 is arranged into one or more portions 144 in step 210. Each portion has one or more contiguous rows. In step 220, each portion 144 is delimited by start and end delimiters 145, 147 and the delimiters 145, 147 for each of the portions 144 containing rolled-in data are stored in the table metadata 146. In step 230 operations are provided that are responsive to the start and end delimiters 145, 147 in accordance with the function of mechanisms 122, 124, 126 and 128 as described above with reference to the operations management module 120 of FIG. 1. Thereby, the data warehouse 140 can be made available to general users while integrity processing of roll-in data is deferred and executed incrementally. In step 240 a sub-portion of a portion 144 is delimited by the start delimiter 145 and an end-of-integrity-processing delimiter 149. In step 250, integrity processing is applied to the rolled-in data contained in the sub-portion as described above with reference to the integrity processing mechanism 128 of FIG. 1. In order to keep the materialized views 150 synchronized with what is visible in the table, locks are applied to rows that are updated in the materialized views 150 with respect to the rows in the sub-portion. In step 260, when integrity processing of the sub-portion has been completed, the integrity processed data is made online accessible (i.e. visible) by moving (i.e. reassigning) the start delimiter 145 to be equal to the end-of-integrity-processing delimiter 149 and corresponding locks in dependent materialized views 150 are released. If there is still data in the portion 144 that has not yet been integrity processed, the end-of-integrity-processing delimiter 149 can be moved to delimit a new sub-portion as described in step 240. Steps 240, 250 and 260 can be repeated until all of the rolled-in data is integrity processed and made online accessible. Note that subsequent iterations of the method, in particular steps 240, 250 and 260, can be deferred without impacting online access to the already integrity processed data. Note also that multiple sub-portions can be processed concurrently while remaining within the scope and spirit of the method according to the present invention.

The method according to the present invention can be implemented by a computer program product comprising computer readable program codes devices.

Figure 4:
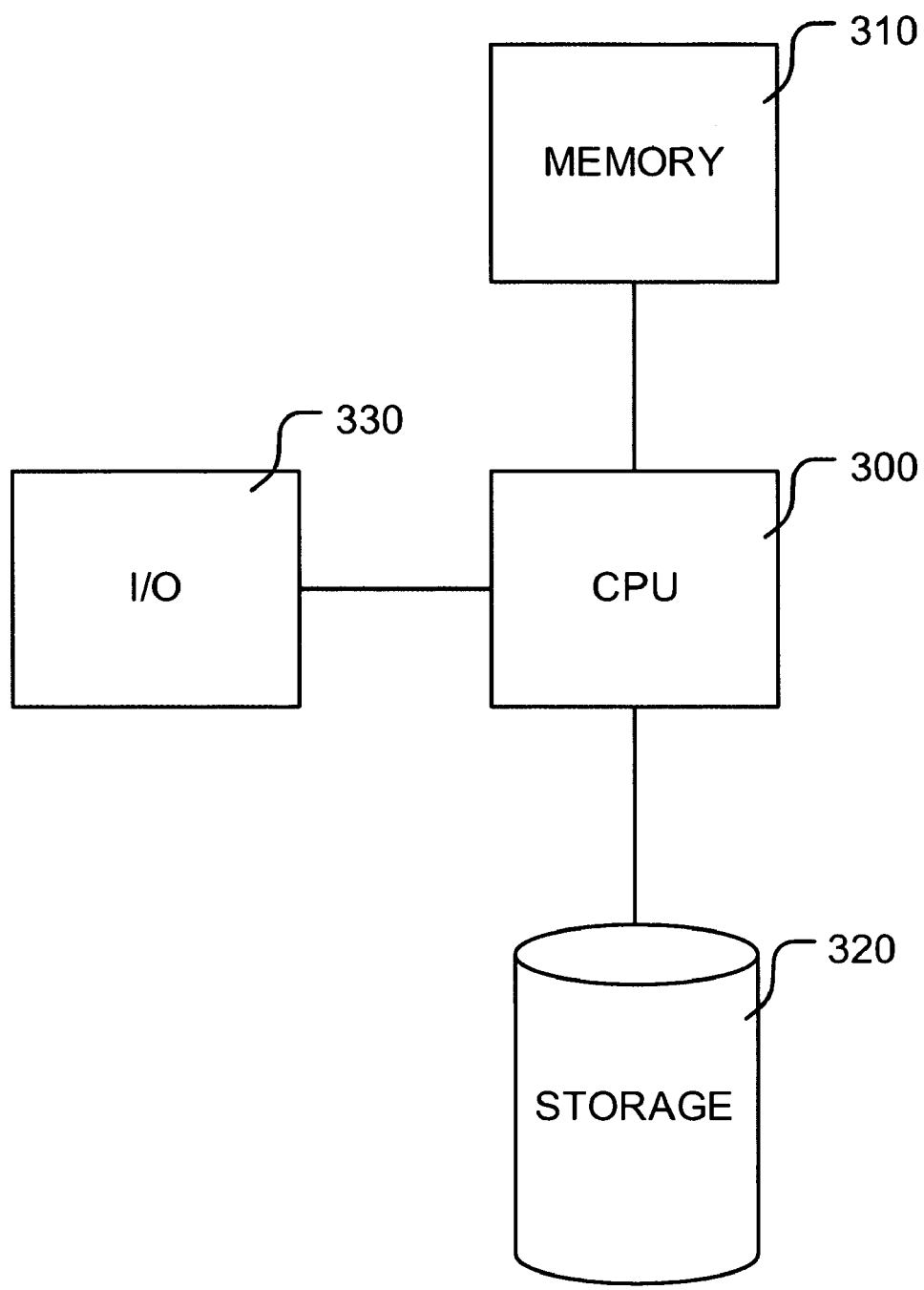
FIG. 4 is a schematic representation of an exemplary generic computing platform on which the present invention can be practiced.

FIG. 4 is a schematic representation of an exemplary generic computing platform on which the present invention can be practiced. A central processing unit (CPU) 300 provides main processing functionality. A memory 310 is coupled to CPU 300 for providing operational storage of programs and data. Memory 310 can comprise, for example, random access memory (RAM) or read only memory (ROM). Non-volatile storage of, for example, data files and programs is provided by a storage device 320 that can comprise, for example, disk storage. Both memory 310 and storage device 320 comprise computer useable media that can store computer program products in the form of computer readable program code. User input and output is provided by an input/output (I/O) facility 330. The I/O facility 330 can include, for example, a graphical display, a mouse and a keyboard.

It will be apparent to one skilled in the art that numerous modifications and departures from the specific embodiments described herein may be made without departing from the spirit and scope of the present invention.

The invention claimed is:

1. A data processing system for providing general user availability while integrity processing of rolled-in data is deferred and performed incrementally, the data processing system comprising:
 a data warehouse administration module for administering a data warehouse to comprise:
 a table dividable into portions for containing rows of rolled-in data;
 a first and a second delimiter delimiting the start and the end respectively of each portion;
 a metadata element having an entry corresponding to the start and end delimiters delimiting each portion;
 a third delimiter for delimiting, between the first delimiter and the third delimiter, a sub-portion of the portion; and
 an operations management module having operation mechanisms for performing operations on the data warehouse responsive to the delimiters, wherein the operation mechanisms include an integrity processing mechanism that uses the first and the third delimiters to identify the sub-portion and thereby determine which data requires integrity processing and further performs integrity processing on the rolled-in data contained in the sub-portion.

2. The data processing system of claim 1, wherein the operation mechanisms further include any one of:
 a table scan mechanism;
 an index scan mechanism; and
 an update mechanism.

3. The data processing system of claim 2, wherein the table scan mechanism is arranged to inhibit general users from accessing rows in a portion delimited by the first and second delimiters.

4. The data processing system of claim 2, wherein the data warehouse administration module administers the data warehouse to further comprise an index mechanism having indices that reference rows and wherein the index scan mechanism is arranged to inhibit general users from accessing any index that refers to a row in a portion delimited by the first and second delimiters.

5. The data processing system of claim 2, wherein the update mechanism provides for modify, insert and delete operations on data in the table,
 for the modify and the delete operations, the update mechanism treats as invisible any rows in a portion delimited by the first and second delimiters and therefore does not permit the operation to occur, and
 for the insert operations, the update mechanism treats as invisible all portions delimited by the first and second delimiters.

6. The data processing system of claim 2, wherein the integrity processing of the sub-portion includes constraint checking, extraction of index key and insertion into the index mechanism, and incremental refresh of dependent materialized views for each said row in the sub-portion.

7. The data processing system of claim 1, wherein the data contained in the sub-portion is made accessible online to a user or made accessible to a user in general after said integrity processing on the data has been completed.

8. The data processing system of claim 7, wherein the data is made accessible online or made accessible to a user in general by making the first delimiter equal to the third delimiter.

9. A data processing system-implemented method of directing a data processing system
to provide general user availability while integrity processing of rolled-in data is
deferred and performed incrementally, the data processing system-implemented method comprising:
administering a data warehouse to comprise:
a table dividable into portions for containing rows of rolled-in data;
a first and a second delimiter delimiting the start and the end respectively of each portion;
a metadata element having an entry corresponding to the start and end delimiters delimiting each portion;
a third delimiter for delimiting, between the first delimiter and the third delimiter, a sub-portion of the portion; and
performing operations on the data warehouse responsive to the delimiters, wherein the performing includes an integrity processing that uses the first and the third delimiters to identify the sub-portion and thereby determine which data requires integrity processing and further performs integrity processing on the rolled-in data contained in the sub-portion.

10. The data processing system-implemented method of claim 9, wherein the performing further includes any one of:
a table scan;
an index scan; and
an update.

11. The data processing system-implemented method of claim 10, wherein the table scan is arranged to inhibit general users from accessing rows in a portion delimited by the first and second delimiters.

12. The data processing system-implemented method of claim 10, wherein the administering administers the data warehouse to further comprise an index mechanism having indices that reference rows and wherein the index scan mechanism is arranged to inhibit general users of from accessing any index that refers to a row in a portion delimited by the first and second delimiters.

13. The data processing system-implemented method of claim 10, wherein the update provides for modify, insert and delete operations on data in the table,
for the modify and the delete operations, the update mechanism treats as invisible any rows in a portion delimited by the first and second delimiters and therefore does not permit the operation to occur, and
for the insert operations, the update mechanism treats as invisible all portions delimited by the first and second delimiters.

14. An article of manufacture for directing a data processing system to provide general user availability while integrity processing of rolled-in data is deferred and performed incrementally, the article of manufacture comprising:
a program usable medium embodying one or more instructions executable by the data processing system, the one or more instructions comprising:
data processing system executable instructions for administering a data warehouse to comprise:
a table dividable into portions for containing rows of rolled-in data;
a first and a second delimiter delimiting the start and the end respectively of each portion;
a metadata element having an entry corresponding to the start and end delimiters delimiting each portion;
a third delimiter for delimiting, between the first delimiter and the third delimiter, a sub-portion of the portion; and
data processing system executable instructions for performing operations on the data warehouse responsive to the delimiters, wherein the operations include integrity processing mechanism that uses the first and the third delimiters to identify the sub-portion and thereby determine which data requires integrity processing and further performs integrity processing on the rolled-in data contained in the sub-portion.

15. The article of manufacture of claim 14, wherein the data processing system executable instructions for performing further includes performing any one of:
a table scan;
an index scan; and
an update.

16. The article of manufacture of claim 15, wherein the table scan is arranged to inhibit general users from accessing rows in a portion delimited by the first and second delimiters.

17. The article of manufacture of claim 15, wherein the data processing system executable instructions for administering administers the data warehouse to further comprise an index mechanism having indices that reference rows and wherein the index scan mechanism is arranged to inhibit general users from accessing an index that refers to a row in a portion delimited by the first and second delimiters.

18. The article of manufacture of claim 15, wherein the update provides for modify, insert and delete operations on data in the table,
for the modify and the delete operations, the update mechanism treats as invisible
any rows in a portion delimited by the first and second delimiters and therefore does not permit the operation to occur, and
for the insert operations, the update mechanism treats as invisible all portions delimited by the first and second delimiters.

* * * * *